US010084890B2

(12) United States Patent
Herr et al.

(10) Patent No.: US 10,084,890 B2
(45) Date of Patent: Sep. 25, 2018

(54) SYSPLEXPORT ALLOCATION ACROSS A Z/OS SYSPLEX (71) Applicant: International Business Machines Corporation, Armonk, NY (US)

(72) Inventors: David A. Herr, Cary, NC (US); Grant S. Mericle, Durham, NC (US); Benjamin T. Rau, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/753,658

(22) Filed: Jun. 29, 2015

(65) Prior Publication Data
US 2016/0381132 A1 Dec. 29, 2016

(51) Int. Cl.
*H04L 29/06* (2006.01)
*H04L 29/08* (2006.01)

(52) U.S. Cl.
CPC .......... *H04L 69/16* (2013.01); *H04L 67/125* (2013.01); *H04L 67/143* (2013.01)

(58) Field of Classification Search
CPC ...... H04L 69/16; H04L 67/125; H04L 67/143
USPC ...................................................... 709/226
See application file for complete search history.

(56) References Cited

U.S. PATENT DOCUMENTS

| | | | |
|---|---|---|---|
| 6,249,800 B1 | 6/2001 | Aman et al. | |
| 7,068,598 B1 * | 6/2006 | Bryson | H04L 29/06 370/230 |
| 7,120,697 B2 | 10/2006 | Aiken, Jr. | |
| 2002/0095496 A1 * | 7/2002 | Antes | H04L 63/0272 709/225 |
| 2002/0095603 A1 * | 7/2002 | Godwin | H04L 63/0272 726/15 |
| 2002/0124089 A1 * | 9/2002 | Aiken, Jr. | H04L 29/06 709/227 |
| 2002/0133602 A1 * | 9/2002 | Godwin | H04L 29/12009 709/229 |

(Continued)

OTHER PUBLICATIONS

White et al., "Communications Server for z/Os V1R8 TCP/IP Implementation vol. 3: High Availability, Scalability, and Performance," An IBM Redbooks publication, Jan. 19, 2007, 280 pages.

(Continued)

*Primary Examiner* — Nicholas Taylor
*Assistant Examiner* — Chong G Kim
(74) *Attorney, Agent, or Firm* — Teddi E. Maranzano (57) ABSTRACT A method, system, and program product for allocating a port for a connection by an application instance on a computer system is provided. The application instances used the port and a shared network address to connect to one or more application instances accessing the shared network address. A distributing stack creates at least one common table of available ports. Each table is associated with a different unique shared network address. When a request is received for a port to assign the shared network address, the distributing stack allocates a set of available ports. When a termination message is received, the distributing stack updates the common table of available ports associated with the shared network address. When a transfer from the distributing stack to a backup distributing stack is made, ownership of the common table of available ports is transferred to the backup distributing stack.

20 Claims, 6 Drawing Sheets

(56) References Cited

U.S. PATENT DOCUMENTS

| | | | | |
|---|---|---|---|---|
| 2002/0143953 A1* | 10/2002 | Aiken, Jr. | H04L 67/1008 | 709/227 |
| 2002/0178265 A1* | 11/2002 | Aiken, Jr. | H04L 29/12009 | 709/227 |
| 2002/0178268 A1* | 11/2002 | Aiken, Jr. | H04L 29/06 | 709/228 |
| 2003/0018813 A1* | 1/2003 | Antes | H04L 63/0272 | 709/245 |
| 2005/0050202 A1* | 3/2005 | Aiken, Jr. | G06F 9/5033 | 709/227 |
| 2006/0155801 A1* | 7/2006 | Brabson | H04W 8/082 | 709/201 |
| 2008/0098126 A1* | 4/2008 | Godwin | H04L 63/0272 | 709/232 |
| 2008/0189428 A1* | 8/2008 | Godwin | H04L 29/12009 | 709/230 |
| 2008/0239963 A1* | 10/2008 | Brabson | H04W 8/082 | 370/235 |
| 2010/0325485 A1* | 12/2010 | Kamath | G06F 11/2097 | 714/15 |
| 2011/0106974 A1* | 5/2011 | Brabson | H04W 8/082 | 709/238 |
| 2012/0096269 A1* | 4/2012 | McAlister | H04L 63/061 | 713/171 |
| 2016/0224363 A1* | 8/2016 | Joy | G06F 9/45558 | |

OTHER PUBLICATIONS

Trowell et al, "S/390 Time Management and IBM 9037 Sysplex Timer," An IBM Redbooks publication, May 13, 1999, 332 pages.

* cited by examiner

SYSPLEXPORT ALLOCATION ACROSS A Z/OS SYSPLEX

BACKGROUND

This disclosure relates generally to network communications and more particularly to network communications in a cluster of computer systems.

In the Internet Protocol (IP) protocol, IP packets are routed from an originator through a network of routers to the destination. All physical adapter devices in such a network, including those for client and server hosts, are identified by an IP address which is unique within the network. One valuable feature of IP is that a failure of an intermediate router node or adapter need not prevent a packet from moving from source to destination, as long as there is an alternate path through the network.

In Transmission Control Protocol/Internet Protocol (TCP/IP), TCP sets up a connection between two endpoints, each identified by their respective IP address and port number pair. Unlike failures of an adapter in an intermediate node, if one of the endpoint adapters (or the link leading to it) fails, all connections through that adapter generally fail and must be reestablished. If the failure is on a client workstation, only a relatively few client connections are typically disrupted. However, an adapter failure on a server may mean that hundreds or thousands of connections may be disrupted.

One alternative to alleviate this situation is to configure a Virtual IP Address (VIPA). A VIPA behaves and is typically configured in the same manner as an IP address would be for a physical network adapter device. However the VIPA, being a virtual object, is not associated with a particular physical device. For example, when a TCP/IP stack on a server receives a networking packet that is destined for one of its configured VIPAs, the TCP/IP stack forwards the packet up the various TCP/IP layers to the destination application. Thus, if a particular physical adapter fails, the remaining attached routing network routes the VIPA-destined packets to the TCP/IP stack using an alternate route. While the VIPA is owned by the TCP/IP stack and reachable through any interface, the VIPA is not tied to any particular adapter. This allows network packets and User Datagram Protocol (UDP) datagram transmissions to be unaffected by a failure of a physical adapter owned by the TCP/IP stack as long as at least one other device remains operational for external connectivity to the same network.

Similarly, a program that access the TCP/IP stack may initiate an outbound connection, acting as a client rather than a server for the purposes of that particular connection. Such a program will typically not bind the socket to any particular local address before initiating the connection and normal TCP rules will use the address of the physical adapter on which the connection request is transmitted. As a result, the connection may be lost if that physical adapter fails while the connection is still active.

For outbound connections, the SOURCEVIPA function of the IP configuration process allows a VIPA to be associated with a group of physical adapters. This causes TCP/IP to use the VIPA instead of the adapter address when a program initiates an outbound connection without binding the socket to a particular IP address. This approach works well when a program is hosted on only one TCP/IP stack, or when the program receiving the connection request does not care what IP address is used for the source address of the connection request. There are some cases, however, where the traditional SOURCEVIPA approach does not meet the needs of a particular application. For example, some application pairs require both members to function as both client and server, where one partner establishes a connection to the other, which in turn establishes a connection back to the first. These applications often use the source and destination IP addresses to correlate the connections. Dynamic VIPA (DVIPA) addresses outages due to failures in a TCP/IP stack or an underlying operating system (OS) image. A DVIPA is a VIPA which can move from one TCP/IP stack to another, without operator intervention, in response to actions in an application or under the control of the OS or TCP/IP stack. Since DVIPAs may move from stack to stack, they typically cannot be used for SOURCEVIPA, which must generally be predictable to be useful.

A TCP connection is generally identified by a combination of source and destination IP address, and source and destination port numbers, known as the connection 4-tuple. Programs initiating outbound connections can rely on the TCP/IP stack to select a port that is not in use, referred to as an ephemeral port or sysplexport. With IP load balancing, such as Sysplex Distributor, the same IP address, referred to as dynamically routable VIPA (DRVIPA), can reside on multiple TCP/IP stacks. Unique connection 4-tuples can be configured using the existing SYSPLEXPORTS option of the VIPADISTRIBUTE configuration statement. However, the configuration process can be complex and error prone.

In current operation, specialized hardware referred to as a Coupling Facility (CF) includes a centralized shared table of sysplexports. Each computer system that participates in the sysplexports DRVIPA distribution registers with the CF for each DRVIPA. The CF then distributes blocks of sysplexports to the participating computer systems. The ports are used once and must be returned to the CF. In this architecture, each computer system maintains a table of it used ports, and when the table is full, the computer system returns the block of ports to the CF. Another block of ports may be requested. Each CF operation to distribute and manage the sysplexports tables uses at least one input/output (I/O) operation that is serialized by multiple locking operations.

Isolating the management of the sysplexports table to the Sysplex Distributor rather than sharing it among all computer systems in the Sysplex can eliminate the CF requirement, improve performance by reducing I/O operations, and remove serialization issues associated with the CF.

SUMMARY

According to one embodiment, a method for allocating a port for a connection originated by an application instance on a computer system is provided whereby the application instance utilizes the port and a shared network address to connect to one or more application instances accessing the shared network address. The method includes creating, by a distributing stack, at least one common table of available ports, whereby each common table of available ports is associated with a different unique shared network address. Responsive to receiving a request from a communication protocol stack on a requesting system for a port to assign the shared network address, the distributing stack allocates a set of available ports. Responsive to receiving a termination message, the distributing stack updates the common table of available ports associated with the shared network address. Responsive to identifying a transfer from the distributing stack to a backup distributing stack, transferring ownership of the common table of available ports to the backup distributing stack.

According to another embodiment, a computer program product for allocating a port for a connection originated by an application instance on a computer system is provided whereby the application instance utilizes the port and a shared network address to connect to one or more application instances accessing the shared network address is provided. The computer program product includes a computer readable storage medium readable by a processing circuit and storing instructions for execution by the processing circuit for performing a method is provided. The method includes creating, by a distributing stack, at least one common table of available ports, whereby each common table of available ports is associated with a different unique shared network address. Responsive to receiving a request from a communication protocol stack on a requesting system for a port to assign the shared network address, the distributing stack allocates a set of available ports. Responsive to receiving a termination message, the distributing stack updates the common table of available ports associated with the shared network address. Responsive to identifying a transfer from the distributing stack to a backup distributing stack, transferring ownership of the common table of available ports to the backup distributing stack.

According to another embodiment, a computer system for allocating a port for a connection originated by an application instance on a computer system is provided. The computer system includes a memory, a processing unit communicatively coupled to the memory, and a management module communicatively coupled to the memory and processing unit, whereby the management module is configured to perform the steps of a method is provided. The method includes creating, by a distributing stack, at least one common table of available ports, whereby each common table of available ports is associated with a different unique shared network address. Responsive to receiving a request from a communication protocol stack on a requesting system for a port to assign the shared network address, the distributing stack allocates a set of available ports. Responsive to receiving a termination message, the distributing stack updates the common table of available ports associated with the shared network address. Responsive to identifying a transfer from the distributing stack to a backup distributing stack, transferring ownership of the common table of available ports to the backup distributing stack.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

In a clustered or IP load balanced environment, such as Sysplex Distributor, a distributing stack associates a single dynamically routable virtual IP address (DRVIPA) and port with a plurality of communication protocols stacks, and routes communications to the appropriate communication protocol stack. The DRVIPA can exist on several communication protocol stacks, but is advertised outside the cluster by only one of the stacks, called the distributing stack. While the present invention is described as an embodiment of a z/OS Sysplex, as will be appreciated by those skilled in the art of clustered computing, the present invention may be practiced in other systems where clusters of computers utilize virtual addresses by associating an application or application group, rather than a particular communications adapter, with the addresses. Thus, the present invention should not be construed as limited to the particular exemplar embodiments described herein.

Figure 1:
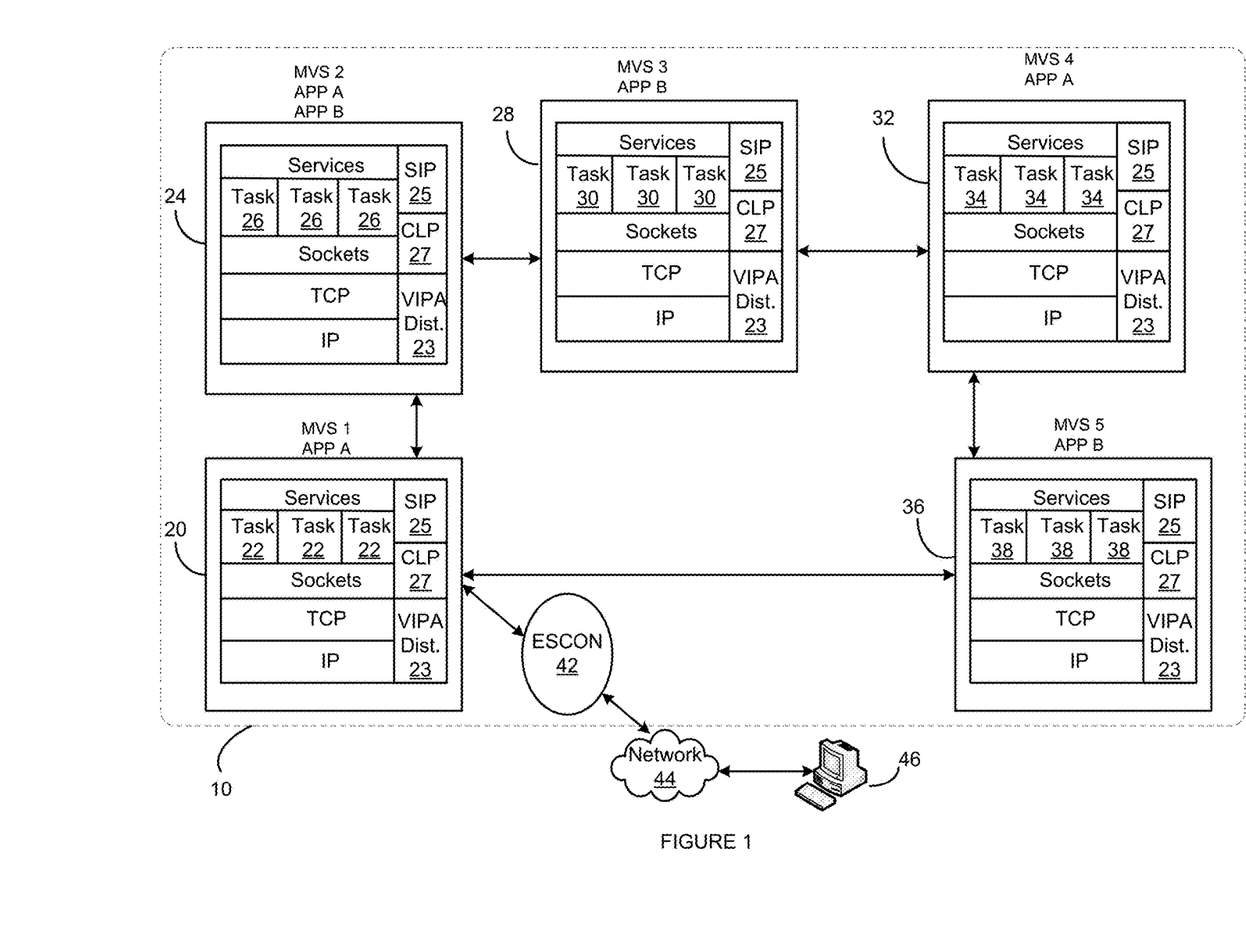
FIG. 1 is a block diagram of a cluster of computer systems which incorporate embodiments of the disclosure.

FIG. 1 illustrates an exemplary cluster of computer systems 20, 24, 28, 32, and 36 interconnected as a cluster of nodes in Sysplex 10. While the present invention will be described primarily with respect to the z/OS operating system executing in a zSeries environment, the computer systems 20, 24, 28, 32, and 36 may include other servers or other operating systems capable of supporting DRVIPA. The computer systems 20, 24, 28, 32, and 36 include communication protocol stacks 22, 26, 30, 34 and 38, for example TCP/IP stacks. The communication protocol stacks 22, 26, 30, 34, and 38 are modified to incorporate a VIPA distribution function 23 that can provide DRVIPAs as a single IP address for the multiple communication protocol stacks 22, 26, 30, 34, and 38. As illustrated, each of the communication protocol stacks 22, 26, 30, 34, and 38 incorporate the VIPA distribution function 23. However, the present invention may be practiced where two or more communication protocol stacks 22, 26, 30, 34, and 38 in a cluster support DRVIPA. The communication protocol stacks 22, 26, 30, 34, and 38 may communicate with an external network 44, for example a Local Area Network (LAN), wide area network (WAN), or through the Internet using an Internet Service Provider. For example, a client 46 may communicate with an application executing on an OS image in the Sysplex 10 through communication protocol stacks 22 and 38, which may function as routing protocol stacks. As a further example, the computer system 20 includes OS image z/OS-1 which hosts an instance of application APP A. The client 46, through the network 44, accesses APP A on computer system 20 through communication protocol stack 22. Similarly, the computer system 24 includes OS image z/OS-2 which hosts an instance of applications APP A and APP B through the communication protocol stack 26. The computer system 28 includes OS image z/OS-3 which hosts a second instance of application APP B through the communication protocol stack 30. The computer system 32 includes OS image z/OS-4 hosting a third instance of application APP A through the communication protocol stack 34. Finally, the computer system 36 includes OS image z/OS-5 which hosts a third instance of application APP B through the communication protocol stack 38. Each of the communication protocol stacks 22, 26, 30, 34, and 38 include an IP address selection module or circuit (SIP) 25 and a cluster-wide port assignment module or circuit (CLP) 27.

The VIPA distribution function 23 allows sharing of DRVIPAs among communication protocol stacks and allows network communication through a routing protocol stack. In this way, all communication protocol stacks having a server application which is associated with the DRVIPA appears to the network 44 as a single IP address. The DRVIPAs may be distributed by designating a particular communication protocol stack, such a communication protocol stack 22, as a routing protocol stack, notifying other communication protocol stacks of the routing protocol stack, and having the other communication protocol stacks notify the routing protocol stack when an application which binds to the DRVIPA is started. At least one backup communication protocol stack can be configured in the cluster. When multiple backup communication protocol stacks are configured, each may be assigned a rank, such as a numeric value, to determine the relative order within the backup chain when a recovery take-over occurs.

More than one DRVIPA may exist in the cluster, based on application definitions. Therefore, the sets of routing protocol stacks, communication protocol stacks, and backup communication protocol stacks may differ or overlap. For example, although computer system 24 hosts an instance of APP A and APP B, the communication protocol stack 26 supports two DRVIPAs: one shared by the first, second, and third instances of APP A; and one shared by the first, second, and third instance of APP B. Although the two DRVIPAs are configured on communication protocol stack 26, their routing protocol stacks and backup communication protocol stacks may reside in stacks other than the communication protocol stack 26.

Figure 2:
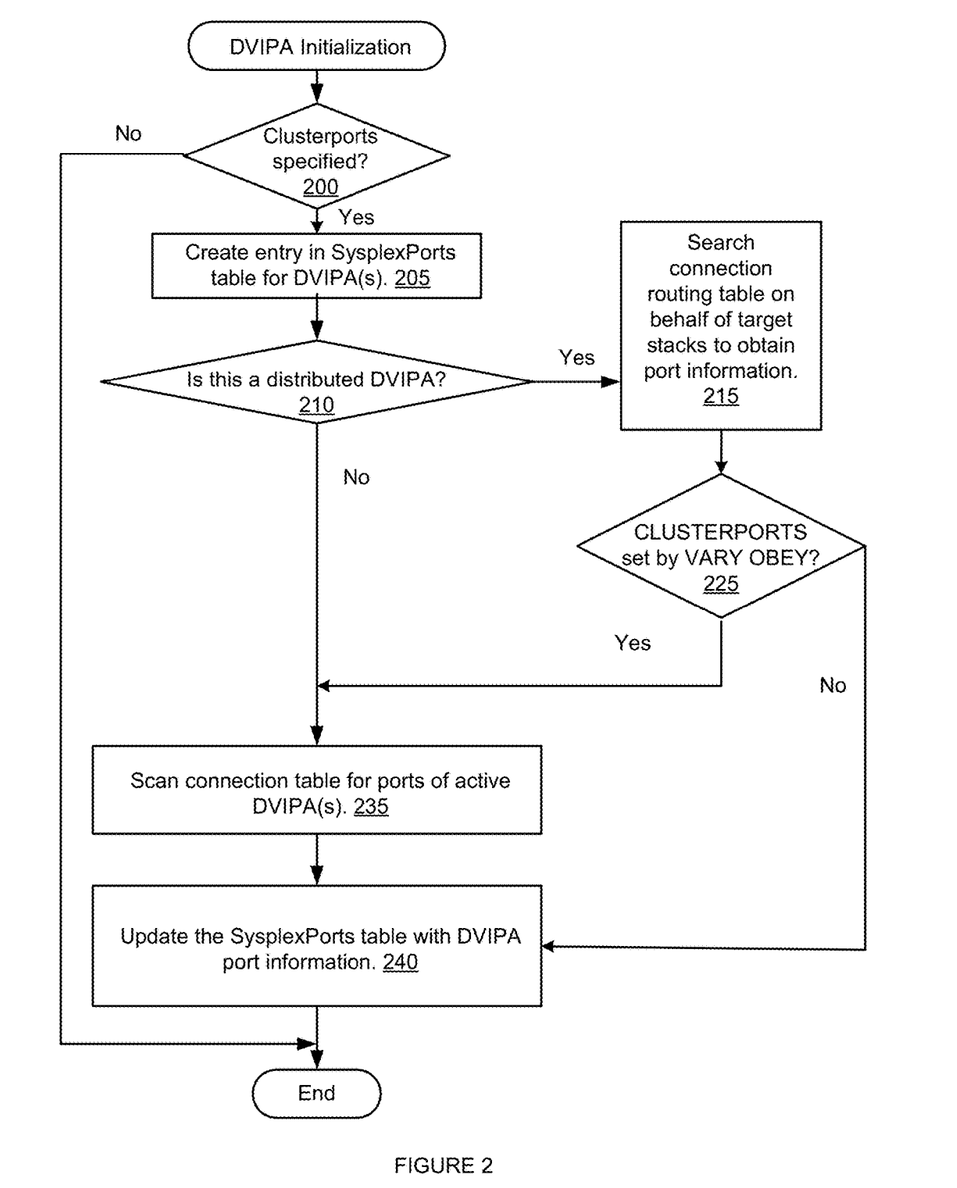
FIG. 2 is a flowchart illustrating operations for initialization of cluster-wide port assignments, according to various embodiments of the disclosure.

FIG. 2 illustrates initializing cluster-wide port assignments. In an exemplary embodiment, the Sysplex Distributor assumes the management of the common table of available ports, hereinafter referred to as the SysplexPorts available ports table when the SYSPLEXPORTS option of the VIPADISTRIBUTE configuration statement is specified.

At 200, a check is made for whether the CLUSTERPORTS option is specified in the configuration statement of the DVIPA or DRVIPA. If CLUSTERPORTS is not specified, then the operation terminates. If CLUSTERPORTS is specified, at 205 a SysplexPorts available table for the DRVIPA is created on the distributing stack. The SysplexPorts available ports table tracks the blocks of ports by DRVIPA, for example in groups of "64", which are issued to each requesting TCP/IP stack. The SysplexPorts available ports table may include an identifier indicating to which target stack the port is assigned, and may take the form of a bitmap, with each bit corresponding to a state of a port such that, for example, a "1" indicates the port is available and a "0" indicates that the port is unavailable. At 210, if a DRVIPA is not being initialized, at 235 the connection table of the TCP/IP stack is scanned for ports of active DRVIPAs, and the SysplexPorts available ports table is updated at 240. At 210, if a DRVIPA is being initialized, the distributing stack searches its connection routing table to obtain port information for connections to the TCP/IP stacks (block 215). If at 225 the CLUSTERPORTS parameter is added via a VARY OBEY command, the connection table of the TCP/IP stack is scanned for ports of active DRVIPAs (block 235). The VARY OBEY command can be used to update TCP/IP profile configuration statements to dynamically make temporary changes to the TCP/IP configuration. If at 225 the CLUSTERPORTS parameter is not added via the VARY OBEY command, at 240 the SysplexPorts available ports table is updated with the port information obtained at block 215 and/or block 235.

Figure 3:
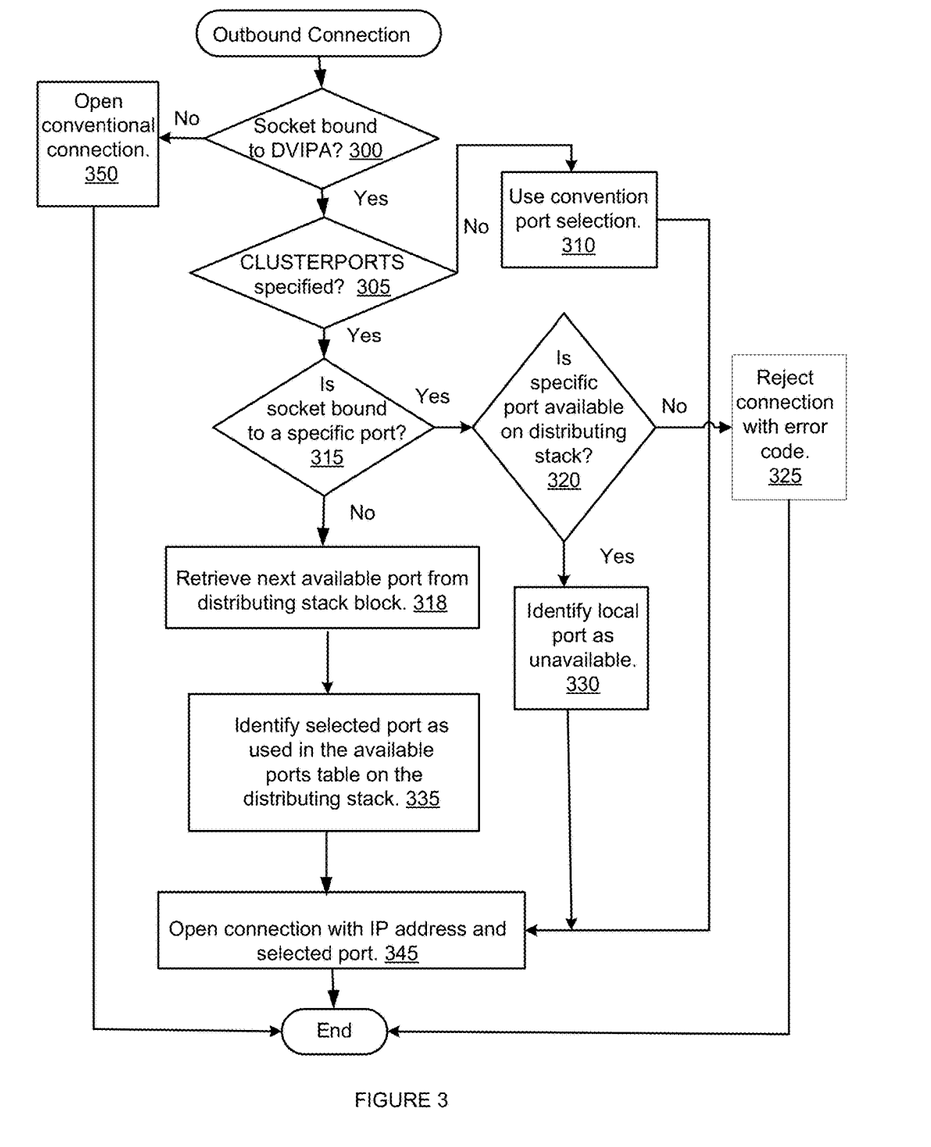
FIG. 3 is a flowchart illustrating operations for initiating a connection utilizing cluster-wide port assignment for a dynamical routable virtual IP address.

FIG. 3 illustrates initiating a connection utilizing cluster-wide port assignment. When a new TCP/IP connection is started on a target stack, for example communication protocol stacks 22, 26, 30, 34 and 38 of FIG. 1, using the DRVIPA as the source IP address and a sysplexport, the target stack selects the sysplexport from its local available port table. If there is no available port, the target stack may use a cross-system message to request a new block of sysplexports for this DRVIPA from the distributing stack, i.e., the Sysplex Distributor. This message may contain a list of unavailable ports, such as well-known ports or other reserved ports. The distributing stack responds with a new block of sysplexports.

At 300, if the socket of the connection request is not bound to the DVIPA, at 350 a conventional non-DVIPA connection is opened. If the socket of the connection request is bound to the DVIPA, but CLUSTERPORTS is not specified, at 310 conventional port selection techniques may be used and the connection is open using the target IP address and the selected port (block 345). If CLUSTERPORTS is specified for the DVIPA at 305, it is determined if the socket is bound to a specific port or if an ephemeral port is selected (block 315). An ephemeral port is a short-lived endpoint that is assigned when a program requests a port for a network connection. A sysplexport, as used herein, is an ephemeral port. For example, binding the socket to port "0" may indicate that a sysplexport is to be selected when a connection request is made. If at 315 the socket is bound to a specific port other than port "0", a check is made to determine if the requested port is available on the distributing stack (block 320). At 325, if the requested port is not available, the connection is rejected with an error notification. If at 320 the requested port is available, specified port may be identified locally as unavailable for use in another connection (block 330), and at 345 the selected port is used to open the connection. However, if at 315 the socket is not bound to a specific port and a sysplexport is to be used, the next available port is retrieved from the block of available ports issued by the distributing stack (block 318) for this DRVPIA. At 335, the port is identified as in use in the available ports table on the distribution stack, and at 345 the selected port is used to open the connection.

Figure 4:
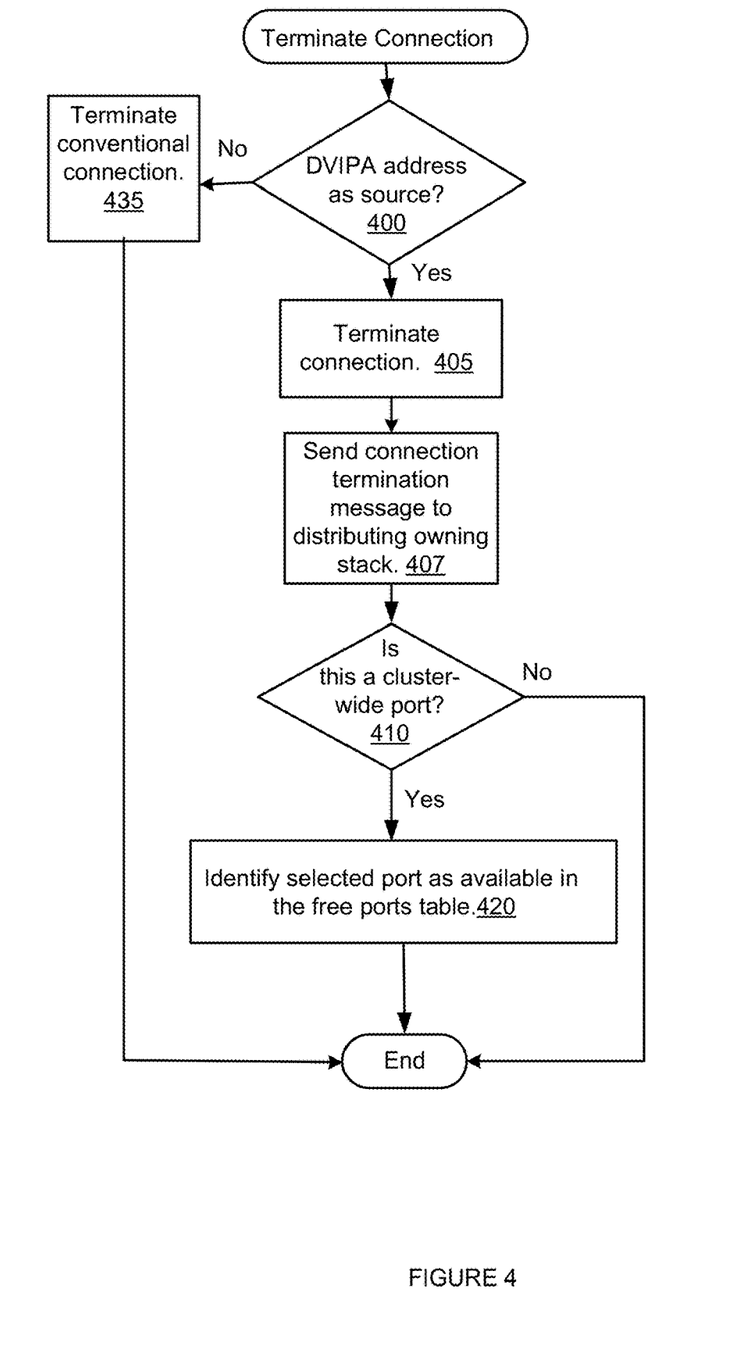
FIG. 4 is a flowchart illustrating operations for termination of a connection utilizing a cluster-wide port assignment.

FIG. 4 illustrates operations terminating a connection utilizing a cluster-wide port assignment. For a connection having a DVIPA as a source address, the disconnecting target stack issues a cross-system message, for example a TERMCONN message, to the distributing stack. This TERMCONN message may include the connection 4-tuple. The distributing stack may use this information to return the sysplexport back to the SysplexPorts available ports table for this DRVIPA. The returned sysplexport is immediately available for distribution to another target stack.

At 400, if a DVIPA is not specified as the source address for the connection, conventional termination operations may be used to terminate the connection (block 435). For a connection having a DVIPA as its source address, at 405 the connection is terminated and appropriate tables are updated as for a conventional DVIPA. At 407, a connection termination message is sent to the distributing stack that owns this DVIPA. At 410, if this is not a cluster-wide port, the termination is complete. For a cluster-wide port, at 420 the distributing stack identifies the selected port as available in the SysplexPorts available ports table.

Figure 5:
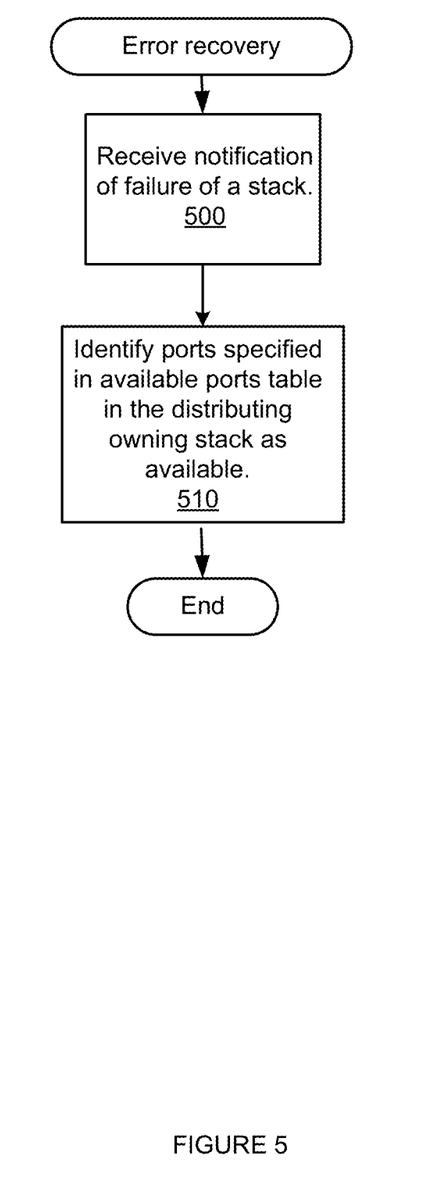
FIG. 5 is a flowchart illustrating operations for recovery from failure of a communication protocol stack utilizing cluster-wide port assignments.

FIG. 5 illustrates recovering from a failure of a distributing stack utilizing cluster-wide port assignment. When a distributing stack that owns a DVIPA changes, a designated backup distributing stack assumes ownership. This may be a planned change, for example by an operator command, or an unplanned change as a result of hardware and/or software failure. For a planned change the distributing stack sends the available ports table information to the backup distributing stack, which assumes management of the SysplexPorts available ports table without operator intervention. For an unplanned change, the target systems send their allocated port information to the backup distributing stack, which rebuilds the available ports table using the collected allocated port information. Collecting the allocated port information and rebuilding the SysplexPorts available ports table occurs without operator intervention.

At 500 the communication protocol stacks are notified of the change, for example by one or more cross-system message. Upon notification of the change in distributing stack, the backup distributing stack rebuilds the available ports table from the collected allocated port information. At 510, available ports are identified in the rebuilt SysplexPorts available ports table in the backup distributing stack.

Figure 6:
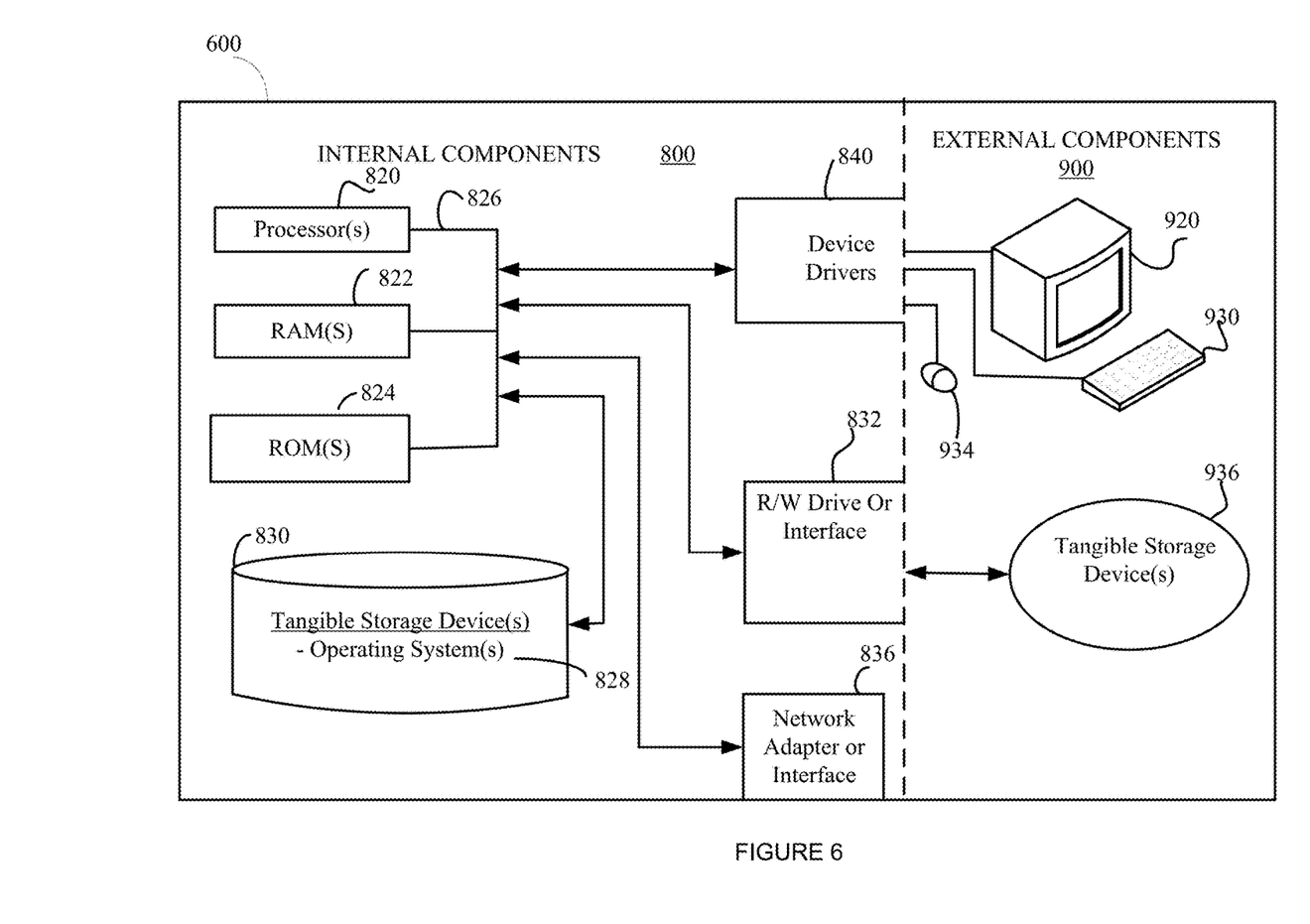
FIG. 6 is a schematic block diagram of hardware and software of the computer environment according to an embodiment of the processes of FIGS. 2-5.

Referring now to FIG. 6, computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 2-5; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive.

Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for allocating a port for a connection originated by an application instance on a computer system, wherein the application instance utilizes the port and a shared network address to connect to one or more application instances accessing the shared network address comprising:

creating, by a distributing stack, at least one common table of available ports, wherein each common table of available ports is associated with a different unique shared network address;

responsive to receiving an initial request from a communication protocol stack on a requesting system for a port associated with the shared network address, the distributing stack allocating a set of available ports associated with the shared network address, marking in the at least one common table of available ports that the allocated set of ports are issued to the requesting communication protocol stack, and sending the set of ports to the requesting communication protocol stack; and responsive to receiving a cross-system message from a second communication protocol stack that has terminated its connection using the shared network address, the distributing stack adding the port to the common table of available ports associated with the shared network address and making the port immediately available for distribution to a third communication protocol stack coupled to the requesting communication protocol stack, wherein the table of available ports is shared without a coupling facility.

2. The method of claim 1, wherein creating the at least one common table further comprises:

selection information for connections to each communication protocol stack associated with the shared network address, wherein the port information is selected from a distributing stack;

creating for the shared network address the common table of available ports based on the selected port information; and marking each port in the common table of available ports as being available based on the port not being in use, and unavailable based on the port being in use.

3. The method of claim 1, further comprising:

based on a socket in an outbound connection request from the communication protocol stack on the requesting system being bound to a specific port, checking the common table of available ports for availability of the specific port, marking the specific port as unavailable for use in another connection, opening the connection using the specific port based on the specific port being available, and rejecting the connection based on the specific port being unavailable;

based on the outbound connection request being for an ephemeral port, retrieving by the communication protocol stack on the requesting system a next available port from the allocated set of available ports; and requesting, by the communication protocol stack on the requesting system, from the distributing stack a new set of available ports based on the allocated set of available ports being unavailable.

4. The method of claim 1, wherein updating the common table of available ports associated with the shared network address further comprises:

sending, by the communication protocol stack on the requesting system, a termination cross-system message to the distributing stack indicating the connection is terminated; and immediately returning the ephemeral port to the common table of available ports.

5. The method of claim 1, wherein transferring ownership further comprises:

sending, by the distributing stack, the common table of available ports to a backup distributing stack wherein the transfer is planned; and responsive to receiving a notification of the backup distributing stack, sending to the backup distributing stack, by each communication protocol stack associated with the DRVIPA, the allocated set of available ports, and rebuilding, by the backup distributing stack, the common table of available ports wherein the transfer is unplanned.

6. A computer program product for allocating a port for a connection originated by an application instance on a computer system, wherein the application instance utilizes the port and a shared network address to connect to one or more application instances accessing the shared network address comprising a computer readable storage medium readable by a processing circuit and storing instructions for execution by the processing circuit for performing a method comprising:

creating, by a distributing stack, at least one common table of available ports, wherein each common table of available ports is associated with a different unique shared network address;

responsive to receiving an initial request from a communication protocol stack on a requesting system for a port associated with the shared network address, the distributing stack allocating a set of available ports associated with the shared network address, marking in the at least one common table of available ports that the allocated set of ports are issued to the requesting communication protocol stack, and sending the set of ports to the requesting communication protocol stack; and responsive to receiving a cross-system message from a second communication protocol stack that has terminated its connection using the shared network address, the distributing stack adding the port to the common table of available ports associated with the shared network address and making the port immediately available for distribution to a third communication protocol stack coupled to the requesting communication protocol stack, wherein the table of available ports is shared without a coupling facility.

7. The computer program product of claim 6, wherein creating the at least one common table further comprises:

selecting from a distributing stack-resident connection routing table port information for connections to each communication protocol stack associated with the shared network address;

creating for the shared network address the common table of available ports based on the selected port information; and marking each port in the common table of available ports as being available based on the port not being in use, and unavailable based on the port being in use.

8. The computer program product of claim 6, further comprising:

based on a socket in an outbound connection request from the communication protocol stack on the requesting system being bound to a specific port, checking the common table of available ports for availability of the specific port, marking the specific port as unavailable for use in another connection, opening the connection using the specific port based on the specific port being available, and rejecting the connection based on the specific port being unavailable;

based on the outbound connection request being for an ephemeral port, retrieving by the communication protocol stack on the requesting system a next available port from the allocated set of available ports; and requesting, by the communication protocol stack on the requesting system, from the distributing stack a new set of available ports based on the allocated set of available ports being unavailable.

9. The computer program product of claim 6, wherein updating the common table of available ports associated with the shared network address further comprises:

sending, by the communication protocol stack on the requesting system, a termination cross-system message to the distributing stack indicating the connection is terminated; and immediately returning the ephemeral port to the common table of available ports.

10. The computer program product of claim 6, wherein transferring ownership further comprises:

sending, by the distributing stack, the common table of available ports to a backup distributing stack wherein the transfer is planned; and responsive to receiving a notification of the backup distributing stack, sending to the backup distributing stack, by each communication protocol stack associated with the shared memory address, the allocated set of available ports, and rebuilding, by the backup distributing stack, the common table of available ports wherein the transfer is unplanned.

11. The computer program product of claim 6, wherein the shared network address is a dynamically routable virtual IP address.

12. A computer system for allocating a port for a connection originated by an application instance on a computer system, wherein the application instance utilizes the port and a shared network address to connect to one or more application instances accessing the shared network address comprising a memory, a processing unit communicatively coupled to the memory, and a management module communicatively coupled to the memory and processing unit, wherein the management module is configured to perform the steps of a method comprising:

creating, by a distributing stack, at least one common table of available ports, wherein each common table of available ports is associated with a different unique shared network address;

responsive to receiving an initial request from a communication protocol stack on a requesting system for a port associated with the shared network address, the distributing stack allocating a set of available ports associated with the shared network address, marking in the at least one common table of available ports that the allocated set of ports are issued to the requesting communication protocol stack, and sending the set of ports to the requesting communication protocol stack; and responsive to receiving a cross-system message from a second communication protocol stack that has terminated its connection using the shared network address, the distributing stack adding the port to the common table of available ports associated with the shared network address and making the port immediately available for distribution to a third communication protocol stack coupled to the requesting communication protocol stack, wherein the table of available ports is shared without a coupling facility.

13. The computer system of claim 12, wherein creating the at least one common table further comprises:

selecting from a distributing stack-resident connection routing table port information for connections to each communication protocol stack associated with the shared network address;

creating for the shared network address the common table of available ports based on the selected port information; and marking each port in the common table of available ports as being available based on the port not being in use, and unavailable based on the port being in use.

14. The computer system of claim 12, further comprising:

based on a socket in an outbound connection request from the communication protocol stack on the requesting system being bound to a specific port, checking the common table of available ports for availability of the specific port, marking the specific port as unavailable for use in another connection, opening the connection using the specific port based on the specific port being available, and rejecting the connection based on the specific port being unavailable;

based on the outbound connection request being for an ephemeral port, retrieving by the communication protocol stack on the requesting system a next available port from the allocated set of available ports; and requesting, by the communication protocol stack on the requesting system, from the distributing stack a new set of available ports based on the allocated set of available ports being unavailable.

15. The computer system of claim 12, wherein updating the common table of available ports associated with the shared network address further comprises:

sending, by the communication protocol stack on the requesting system, a termination cross-system message to the distributing stack indicating the connection is terminated; and immediately returning the ephemeral port to the common table of available ports.

16. The computer system of claim 12, wherein transferring ownership further comprises:

sending, by the distributing stack, the common table of available ports to a backup distributing stack wherein the transfer is planned; and responsive to receiving a notification of the backup distributing stack, sending to the backup distributing stack, by each communication protocol stack associated with the DRVIPA, the allocated set of available ports, and rebuilding, by the backup distributing stack, the common table of available ports wherein the transfer is unplanned.

17. The computer system of claim 14, wherein the ephemeral port is a sysplexport.

18. The computer system of claim 12, wherein the shared network address is a dynamically routable virtual IP address.

19. The method of claim 1, further comprising:

responsive to a planned change in ownership of the at least one common table of available ports to a backup distributing stack, sending, by the distributing stack, the at least one common table of available ports to the backup distributing stack; and notifying, by the backup distributing stack, communication protocol stacks having entries in the at least one common table of available ports, of the changed ownership using one or more cross-system messages.

20. The method of claim 1, further comprising:
responsive to an unplanned change in ownership of the at least one common table of available ports to a backup distributing stack, notifying, by the backup distributing stack, communication protocol stacks having entries in the at least one common table of available ports, of the changed ownership using one or more cross-system messages;
collecting allocated port information from the notified communication protocol stacks; and
rebuilding the at least one common table of available ports from the collected allocated port information.

\* \* \* \* \*